(12) United States Patent
McBride et al.

(10) Patent No.: US 12,449,595 B2
(45) Date of Patent: Oct. 21, 2025

(54) INTEGRATED VACUUM CELL ASSEMBLIES

(71) Applicant: SRI International, Menlo Park, CA (US)

(72) Inventors: Sterling Eduardo McBride, Princeton, NJ (US); Joey J. Michalchuk, Lambertville, NJ (US); Seth Charles Caliga, Lafayette, CO (US); Alan M. Braun, Princeton, NJ (US)

(73) Assignee: SRI INTERNATIONAL, Menlo Park, CA (US)

( * ) Notice: Subject to any disclaimer, the term of this patent is extended or adjusted under 35 U.S.C. 154(b) by 278 days.

(21) Appl. No.: 17/758,930

(22) PCT Filed: Oct. 7, 2020

(86) PCT No.: PCT/US2020/054599
§ 371 (c)(1),
(2) Date: Jul. 15, 2022

(87) PCT Pub. No.: WO2021/145931
PCT Pub. Date: Jul. 22, 2021

(65) Prior Publication Data
US 2023/0049199 A1  Feb. 16, 2023

Related U.S. Application Data

(60) Provisional application No. 62/961,791, filed on Jan. 16, 2020.

(51) Int. Cl.
*G02B 6/122* (2006.01)
*G02B 6/12* (2006.01)

(52) U.S. Cl.
CPC .. *G02B 6/1228* (2013.01); *G02B 2006/12138* (2013.01)

(58) Field of Classification Search
CPC ................... B81C 2203/031; G02B 6/1228
See application file for complete search history.

(56) References Cited

U.S. PATENT DOCUMENTS

| 5,082,342 A | * | 1/1992 | Wight | ................... G02F 1/295 |
| | | | | 372/44.01 |
| 7,400,207 B2 | | 7/2008 | Lipp et al. | |

(Continued)

FOREIGN PATENT DOCUMENTS

| CN | 102365330 A | 1/2014 |
| CN | 106323897 A | 1/2017 |

(Continued)

OTHER PUBLICATIONS

Arpornthip et al., "Vacuum Pressure Measurements using a Magneto-Optical Trap", vol. 85, No. 3, Mar. 2, 2012, 8 pp.

(Continued)

*Primary Examiner* — Thomas A Hollweg
*Assistant Examiner* — Kirsten D. Endresen
(74) *Attorney, Agent, or Firm* — Shumaker & Sieffert, P.A.

(57) ABSTRACT

The disclosure describes vacuum cell assemblies that integrate a vacuum envelope with a photonic integrated circuit (PIC). Walls of the vacuum envelope are coupled to the PIC, such as through anodic bonding, so that the PIC forms at least one wall of the vacuum envelope and provides an optically accessible medium and surface for transmitting and distributing light into various cavities of the vacuum envelope through one or more nonplanar waveguides. A surface of the PIC may include a material that is compatible with a material of the walls of the vacuum envelope, such as a silicon-based vacuum envelope bonded to a silicon nitride or amorphous silicon surface of the PIC. Each waveguide may include a bridge structure that forms a planar surface for tightly bonding with the vacuum envelope and preserves (Continued)

properties of the transmitted light between opposing sections of the waveguide.

17 Claims, 7 Drawing Sheets

(56) References Cited

U.S. PATENT DOCUMENTS

| | | | |
|---|---|---|---|
| 7,470,971 | B2 | 12/2008 | McBride |
| 7,807,509 | B2 | 10/2010 | McBride |
| 7,955,551 | B2 | 6/2011 | McBride et al. |
| 8,080,778 | B2 | 12/2011 | McBride |
| 8,405,021 | B2 | 3/2013 | Anderson et al. |
| 8,415,612 | B2 | 4/2013 | McBride et al. |
| 8,532,442 | B2 | 9/2013 | Kondou et al. |
| 9,631,781 | B2 | 4/2017 | Ide et al. |
| 10,270,002 | B2 | 4/2019 | Kautzsch |
| 2009/0095414 | A1 | 4/2009 | McBride |
| 2009/0154872 | A1 | 6/2009 | Sherrer et al. |
| 2010/0033256 | A1* | 2/2010 | Strabley ............ G04F 5/14 331/3 |
| 2010/0207016 | A1 | 8/2010 | McBride et al. |
| 2019/0237930 | A1* | 8/2019 | Lebby ............ H01S 5/02326 |
| 2020/0038658 | A1 | 2/2020 | Tyler et al. |
| 2020/0343081 | A1 | 10/2020 | McBride et al. |
| 2020/0386581 | A1 | 12/2020 | Hoyt et al. |

FOREIGN PATENT DOCUMENTS

| | | | |
|---|---|---|---|
| CN | 103931063 A | 4/2017 | |
| EP | 3385692 A1 | 10/2018 | |
| WO | 2019018544 A1 | 1/2019 | |
| WO | WO-2019014330 A1 * | 1/2019 | ............ B03C 3/40 |
| WO | WO-2019180655 A1 * | 9/2019 | ............ G02B 6/122 |

OTHER PUBLICATIONS

Bogaerts et al., "Silicon Photonics Circuit Design: Methods, Tools and Challenges", Laser & Photonics Reviews, vol. 12, No. 04, Jan. 8, 2018, 31 pp.
Cheben et al., "Broadband polarization independent nanophotonic coupler for silicon waveguides with ultra-high efficiency", vol. 23, No. 17, Optics express, Aug. 24, 2015, pp. 22553-22563.
Gupta et al., "50GHz Ge Waveguide Electro-Absorption Modulator Integrated in a 220nm SOI Photonics Platform", Optical Fiber Communication Conference, vol. 1, Optica Publishing Group, Mar. 22, 2015, pp. 5-7.
Hooverman et al., "Charged particle orbits in a logarithmic potential", Journal of Applied Physics, vol. 34, No. 12, AIP Publishing, Jul. 24, 1963, pp. 3505-3508.
Hoth et al., "Atom number in magneto-optic traps with millimeter scale laser beams", Optics letters, vol. 38, No. 5, Optica Publishing Group, Mar. 1, 2013, pp. 661-663.
International Preliminary Report on Patentability from International Application No. PCT/US2020/054599 dated Jul. 28, 2022, 9 pp.
International Search Report and Written Opinion of International Application No. PCT/US2020/054599 dated Jan. 21, 2021, 7 pp.
Macaulay et al., "Cesiated thin-film field-emission microcathode arrays", Applied Physics Letters, vol. 61, No. 8, Jun. 22, 1992, pp. 997-999.
Salim et al., "Compact, microchip-based systems for practical applications of ultracold atoms", Quantum Information Processing, vol. 10, No. 06, Springer Science+Business Media, LLC, Sep. 24, 2011, pp. 975-994.
Scherer et al., "Characterization of alkali metal dispensers and non-evaporable getter pumps in ultrahigh vacuum systems for cold atomic sensors", Journal of Vacuum Science & Technology A: Vacuum, Surfaces, and Films, vol. 30, No. 6, AVS, Nov. 9, 2012, 16 pp.
Schwoebel et al., "Emission uniformity enhancement between microfabricated tips in cold cathode arrays", Journal of Vacuum Science & Technology B: Microelectronics and Nanometer Structures Processing, Measurement, and Phenomena, vol. 19, No. 2, Dec. 11, 2000, pp. 582-584.
Sorace-Agaskar et al., "Electro-optical co-simulation for integrated CMOS photonic circuits with VerilogA", vol. 23, No. 21, Optics express, Oct. 19, 2015, pp. 27180-27203.
Spindt et al., "Field emission cathode array development for high-current-density applications", Applications of Surface Science, vol. 16, No. 1-2, North-Holland Publishing Company, Sep. 7, 1982, pp. 268-276.
Spindt et al., "Field-emitter arrays for vacuum microelectronics", IEEE Transactions on Electron Devices, vol. 38, No. 10, Oct. 1, 1991, pp. 2355-2363.
Response to Communication Pursuant to Rules 161(1) and 162 EPC dated Aug. 23, 2022, from counterpart European Application No. 20914293.4, filed Feb. 21, 2023, 8 pp.
Extended Search Report from counterpart European Application No. 20914293.4 dated Jan. 15, 2024, 8 pp.
First Office Action and Search Report, and translation thereof, from counterpart Chinese Application No. 202080093110.0 dated Nov. 21, 2023, 18 pp.
Response to Communication Pursuant to Rule 70(2) EPC dated Feb. 1, 2024, from counterpart European Application No. 20914293.4, filed Aug. 1, 2024, 19 pp.
Second Office Action from counterpart Chinese Application No. 202080093110.0 dated Jul. 12, 2024, 14 pp.
Decision of Rejection, and translation thereof, from counterpart Chinese Application No. 202080093110.0 dated Dec. 19, 2024, 13 pp.

* cited by examiner

INTEGRATED VACUUM CELL ASSEMBLIES

This application is a national stage entry of PCT Patent Application No. PCT/US2020/054599, filed 7 Oct. 2020, which claims the benefit of U.S. Provisional Patent Application No. 62/961,791, filed 16 Jan. 2020, the entire contents of each of which is incorporated reference.

GOVERNMENT RIGHTS

This invention was made with Government support under D17PC00346 awarded by DOI, Interior Business Center. The Government has certain rights in the invention.

TECHNICAL FIELD

The disclosure relates to vacuum cell assemblies.

BACKGROUND

Atomic sensors may be used in atomic clocks, gyroscopes, magnetometers, interferometers, and other devices that precisely measure relatively small changes in parameters, such as time and acceleration. Atomic sensors use atomic spectroscopy and light-atom interactions to detect changes in properties of vaporized atoms in a volume and obtain precise measurements for parameters acting on the vaporized atoms. An atomic sensor may operate under high vacuum to reduce contamination of the volume and improve accuracy of the measurements. Such high vacuum conditions may limit placement of various measurement components interacting with the volume to an exterior of the volume.

SUMMARY

In general, this disclosure describes compact, robust vacuum cell assemblies that integrate a vacuum envelope with a photonic integrated circuit (PIC). The vacuum envelope includes one or more cavities that house various components, such as a magneto-optical trap, getter assembly, or ion pump. Walls of the vacuum envelope are coupled to the PIC, such as through anodic bonding, so that the PIC forms at least one wall of the vacuum envelope and provides an optically accessible medium and surface for transmitting and distributing light into the various cavities of the vacuum envelope through one or more nonplanar waveguides. A surface of the PIC may include a material that is compatible (e.g., similar coefficient of thermal expansion or high integrity under fabrication conditions, such as anodic bonding) with a material of the walls of the vacuum envelope, such as a silicon-based vacuum envelope bonded to a silicon nitride or amorphous silicon surface of the PIC. To hermetically seal these nonplanar waveguides against the walls of the vacuum envelope, each waveguide may include a bridge structure that forms a planar surface for tightly bonding with the vacuum envelope and preserves properties of the transmitted light between opposing sections of the waveguide. Optical components may interface with the PIC to manipulate light through, emit light into, and/or receive light from the waveguides, and in some instances, may include electronics directly integrated into the PIC. In these various ways, vacuum cell assemblies described herein may be relatively robust, compact, and simple to manufacture compared to vacuum cell assemblies that do not include a vacuum envelope integrated with a PIC.

In one example, an apparatus as described herein includes a photonic integrated circuit and a vacuum envelope. The photonic integrated circuit includes one or more waveguides configured in a substrate. The vacuum envelope includes one or more walls coupled to a top surface of the substrate. Each waveguide is configured to transmit light from a light input surface to an interior of the vacuum envelope. In an example of the apparatus described above, each waveguide includes a bridge structure coupled to the one or more walls of the vacuum envelope and planar with the portion of the top surface of the substrate. The bridge structure is configured to guide light through the bridge structure. In another example of the apparatus described above, the vacuum envelope further includes a getter cavity housing a getter, a magneto-optical trap (MOT) cavity fluidically coupled to the getter cavity, and a pump cavity fluidically coupled to the MOT cavity and housing an ion pump.

In another example, a method for forming one or more vacuum cells as described herein includes, for each vacuum cell, forming one or more waveguides in a substrate of a photonic integrated circuit and bonding one or more walls of a vacuum envelope to a top surface of the substrate to form the vacuum cell.

The details of one or more examples are set forth in the accompanying drawings and the description below. Other features, objects, and advantages of the disclosure will be apparent from the description and drawings, and from the claims.

DETAILED DESCRIPTION

Figure 1A:
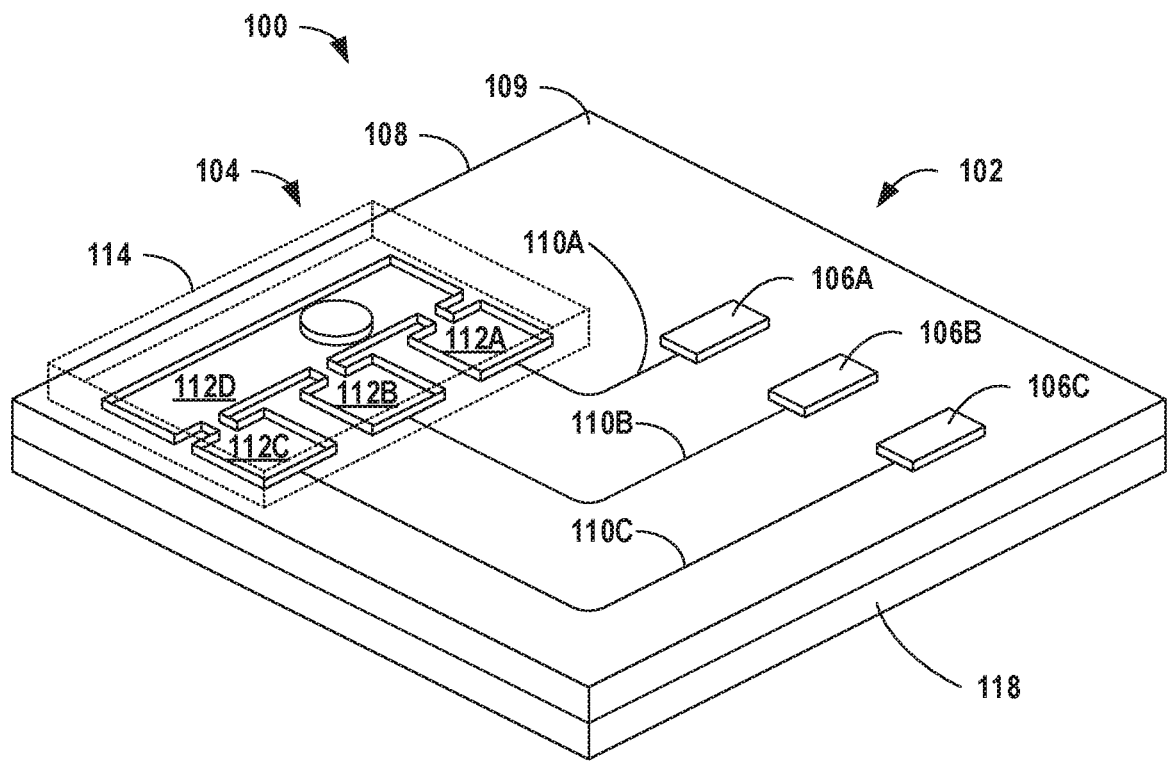
FIG. 1A is a perspective view diagram illustrating an example assembly, in accordance with examples discussed herein.
Figure 1B:
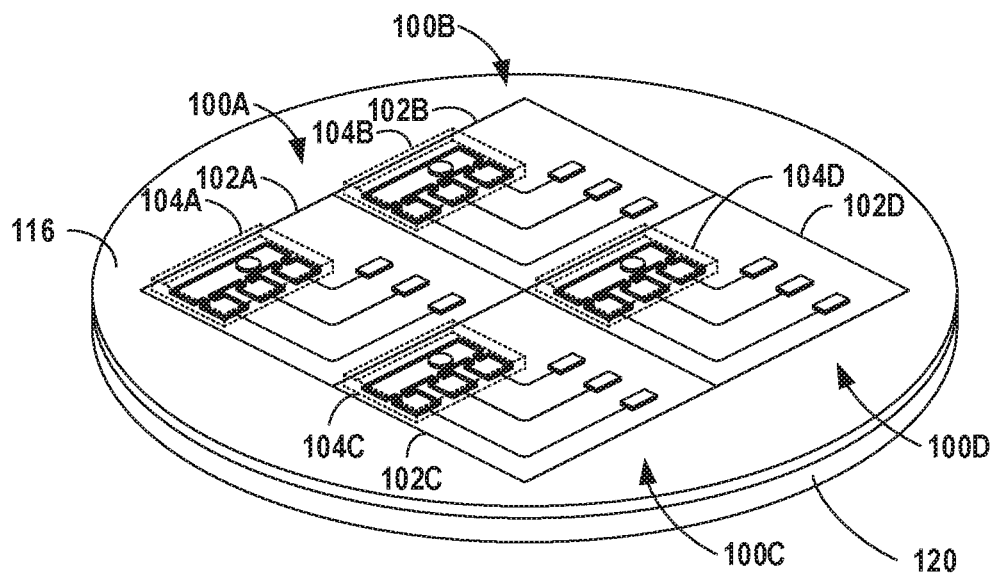
FIG. 1B is a perspective view diagram illustrating an example collection of assemblies, in accordance with examples discussed herein.

Vacuum cell assemblies described herein may be incorporated into atomic sensors for a variety of applications, such as an atomic clock, a gyroscope, an accelerometer, a magnetometer, an interferometer, a navigation unit, an electrometer, an ultra-low vacuum sensor, a quantum memory device, quantum repeater, a quantum computing device, and the like. Vacuum cell assemblies may establish and maintain a physics package of the atomic sensor at ultra-high vacuum (UHV) conditions, i.e., $P<10^{-9}$ torr. FIG. 1A is a perspective view diagram illustrating an example vacuum cell assembly, in accordance with examples discussed herein. Assembly 100 includes a photonic integrated circuit 102 and a vacuum envelope 104. While only one vacuum envelope 104 and one photonic integrated circuit 102 are shown, a vacuum cell assembly may include support more than one each of vacuum envelope 104 and photonic integrated circuit 102. For example, one or more vacuum envelopes 104 may be sandwiched between two photonic integrated circuits, such illustrated in FIG. 5C below. As another example, an array of vacuum envelopes 104 may be positioned on a single substrate having multiple photonic integrated circuits, such as illustrated in FIG. 1B below.

Vacuum envelope 104 may be configured to contain various functional components of vacuum cell assembly 100 in a sealed environment. For example, vacuum envelope 104 may be a planar, monolithic substrate with micromachined or etched cavities that may be covered by glass plates to form cavities 112A, 112B, 112C, and 112D (individually "cavity 112" and collectively "cavities 112"). Cavities 112 may house the various functional components of vacuum cell assembly 100, such as an ion pump cavity housing an ion pump, physics chamber cavity, a dispenser/getter cavity configured to house an atom source and/or a gas getter, and various optics associated with the physics chamber cavity. For example, vacuum envelope 104 may include a magneto-optical trap (MOT) chamber cavity fluidically coupled to the getter cavity and the pump cavity.

Cavities 112 may be fluidically coupled to each other, such as through microchannels or apertures, to form an arrangement of interconnected cavities for differential pumping of a range of pressures, such as $10^{-7}$ to $10^{-10}$ torr. For example, a physics chamber cavity may fluidically coupled to ion pump cavity, such that cold atom physics chamber cavity may be at a very high vacuum. Within such a vacuum, laser-confined "cold atoms" allow precision sensing with high resolution, sensitivity, and long-life operation, as the sensing elements the quantum states of the alkali-atoms may be substantially free from deleterious interactions with the ambient environment, including interactions with buffer gases, cell walls, or magnetic fields, all of which may distort the sensing atomic states. In some examples, physics chamber cavity may define a relatively small volume, such as a volume on the order of tens of cubic centimeters, such as about 25 cm$^3$. In some examples, a volume of vacuum envelope 104 is less than about 100 cm$^3$.

Vacuum envelope 104 may be formed from materials selected for a variety of properties including, but not limited to, coefficient of thermal expansion, magnetic permeability, melting point, and the like. A variety of materials may be used to form vacuum envelope 104 including, but not limited to, silicon, aluminosilicate glass, aluminum nitride, aluminum oxide, silicon carbide, sapphire, ceramics, and the like.

In some examples, vacuum envelope 104 may be formed from a material having a relatively low magnetic permeability. For example, functional components of atomic sensors may be sensitive to changes in magnetic fields, such that by incorporating low magnetic permeability materials, vacuum envelope 104 may have a reduced impact on measurements of the atomic sensor.

Vacuum envelope 104 may be formed from one or more materials suitable for maintaining relatively high vacuum (e.g., $<10^{-4}$ torr). For example, at relatively high vacuum, contaminants from outside vacuum envelope 104 and/or impurities in walls or adhesives of vacuum envelope 104 may leak into a volume of vacuum envelope 104, thereby making maintenance of the high vacuum difficult or impossible.

In some examples, vacuum envelope 104 may be formed from a material having a high compatibility with anodic bonding within vacuum envelope 104 (e.g., between walls 114 of vacuum envelope 104). For example, the material or materials of vacuum envelope 104 may have relatively similar crystalline structure and/or may be relatively dimensionally stable at high temperatures at which anodic bonding may take place. In some examples, one or more walls 114 of vacuum envelope 104 may be a silicon substrate on lateral sides and a glass plate on top sides, in which the top plate is anodically bonded to the silicon substrate to form a seal configured for very low vacuum pressures. Such a sealed vacuum envelope 104 may allow robust ultra-high vacuum-compatible anodic bonding, material handling, and bake-out processes that allow direct integration of sealed vacuum envelope 104 with other glass/silicon cold atom vacuum cells and systems.

In some examples, vacuum envelope 104 may be formed from a material having a relatively high melting point and/or dimensional stability at high temperatures. For example, the material of vacuum envelope 104 may include impurities that leach into a volume of vacuum envelope, such that high vacuum may be difficult to achieve. To remove a substantial amount of these impurities, the material of vacuum envelope 104 may be heat treated to bake out these impurities. This heat treatment may occur at temperatures for which the impurities may become vaporized, but for which the material of vacuum envelope 104 may remain relatively dimensionally stable. As a result, vacuum envelope 104 may be maintained at relatively high vacuum.

Vacuum envelope 104 includes one or more walls 114 coupled to a top surface of photonic integrated circuit 102. For example, vacuum envelope 104 may be bounded on sides by one or more lateral walls, on top by one or more top walls, and on bottom by a top surface 109 of photonic integrated circuit 102. One or more cavities 112 of vacuum envelope 104 may be directly exposed to top surface 109, such that light from photonic integrated circuit 102 may exit top surface 109 and contact various materials within cavities 112. For example, cavities 112 may include various volumes or elements that may be probed or activated using light.

Photonic integrated circuit 102 may be configured as an electrical and optical platform for transmitting electrical and optical signals between cavities 112, and components within cavities 112, of vacuum envelope 104 and one or more components 106A, 106B, and 106C (individually "component 106" and collectively "components 106") outside vacuum envelope 104. Photonic integrated circuit 102 may be configured to transmit optical signals between components 106 and cavities 112. For example, various components within cavities 112, such as a magneto-optical trap or a getter material, may be probed or activated by light. Photonic integrated circuit 102 may be configured to direct light into cavities 112 to probe or activate the various components. For example, as will be described further below, photonic integrated circuit 102 may include one or more optics that direct light in particular directions to create light-atom interactions. In some examples, photonic integrated circuit 102 may be configured to transmit electrical signals between components 106 or components within vacuum envelope 104 and one or more power or control devices. For example, various components may use electricity to create potential differences, such as in an ion pump, or as a power source, such as for photon sources. Photonic integrated circuit 102 may supply electrical signals to power and/or control components 106 or components within vacuum envelope 104.

Photonic integrated circuit 102 includes a substrate 108. Substrate 104 may be formed from materials selected for a variety of properties including, but not limited to, coefficient of thermal expansion, magnetic permeability, melting point, and the like. A variety of materials may be used to form substrate 108 including, but not limited to, silicon or silicon-based substrates, such as silica, silicon nitride, and amorphous silicon; Group III-V compound semiconductor substrates, such as gallium arsenide; and the like. In some examples, substrate 108 includes a Group III-V compound semiconductor and one or more walls 114 of vacuum envelope 104 include at least one of silicon or a silicon-based compound.

Photonic integrated circuit 102 may be formed from one or more materials suitable for transmitting light. For example, waveguides 110 may be formed directly into substrate 108, such that substrate 108 forms one or more walls and/or provides cladding for transmission of the light along waveguides 110. In some examples, waveguides 110 may be relatively low loss waveguides. For example, substrate 108 may include a crystalline structure that is capable of forming relatively planar surfaces. Prior to forming waveguides 110, a surface of substrate 108 may be lapped to provide a relatively planar surface for forming a top surface of waveguides 110. Lithographic techniques may form relatively flat sidewalls of waveguides 110. As a result, losses due to roughness of cladding may be reduced.

Photonic integrated circuit 102 and vacuum envelope 104 may be configured to be relatively compatible with each other such that, when bonded, photonic integrated circuit 102 and vacuum envelope 104 may form a seal sufficient to maintain relatively high vacuum (e.g., <$10^{-4}$). Substrate 108 may be configured to form top surface 109 for bonding with one or more walls 114 of vacuum envelope 104. For example, substrate 108 may include one or more layers configured to increase compatibility of top surface 109 of substrate 108 with walls 114 of vacuum envelope 104.

In some examples, photonic integrated circuit 102 and vacuum envelope 104 may be configured to have a relatively similar coefficient of thermal expansion. For example, substrate 108 may include a top layer forming top surface 109 formed from a material having a coefficient of thermal expansion (CTE) that is relatively similar to a coefficient of thermal expansion of one or more walls 114 of vacuum envelope 104. In some examples, a difference in CTE at an interface between a portion of vacuum envelope 104 and a portion of photonic integrated circuit 102 contacting the portion of vacuum envelope 104 is less than about 5 ppm/° C. For example, substrate 108 may include a top layer forming top surface 109 that includes a material having a CTE that is within about 5 ppm/° C. of a CTE of one or more walls 114 of the vacuum envelope 104. In some examples, a difference in CTE at an interface between a portion of vacuum envelope 104 and a portion of photonic integrated circuit 102 contacting the portion of vacuum envelope 104 is less than about a factor of 3.

In some examples, photonic integrated circuit 102 and vacuum envelope 104 may be configured to be relatively compatible for anodic bonding. For example, substrate 108 may include a top layer forming top surface 109 formed from a material having a high compatibility with anodic bonding to walls 114 of vacuum envelope 104. Compatible materials may include materials having relatively similar crystalline structure and/or that may be relatively dimensionally stable at high temperatures at which anodic bonding may take place.

In some examples, vacuum cell assembly 100 includes a microchip 118 physically and communicatively coupled to photonic integrated circuit 102. Microchip 118 may be configured to supply electrical and/or control signals to one or more components of photonic integrated circuit 102 or within vacuum envelope 104. For example, microchip 118 may include control circuitry configured to control operation of one or more components of assembly 100, such as an ion pump, one or more components 106, and the like. Microchip 118 may be bump bonded to photonic integrated circuit 102. Microchip 118 and photonic integrated circuit 102 may include one or more electrical feedthroughs configured to transmit the electrical and/or control signals to the various components. In some examples, components of assembly 100 may be operable by a CMOS operating voltage, such as less than about 5.0 volts. Additionally or alternatively, assembly 100 may include other control circuitry configured to send and receive electrical and/or control signals. For example, control circuitry communicatively coupled to assembly 100, such as microchip 118 or other control circuitry, may include a variety of processing components including, but not limited to, one or more processors, including one or more microprocessors, digital signal processors (DSPs), application specific integrated circuits (ASICs), field programmable gate arrays (FPGAs), or any other equivalent integrated or discrete logic circuitry (e.g., control circuitry), as well as any combinations of such components.

Photonic integrated circuit 102 includes one or more waveguides 110A, 110B, and 110C (individually "waveguide 110" and collectively "waveguides 110") configured in substrate 108. Each waveguide 110 is configured to transmit light from a light input surface to an interior of vacuum envelope 104, such as one or more of cavities 112. In the example of FIG. 1A, waveguide 110A is optically coupled to component 106A and cavity 112A, waveguide 110B is optically coupled to component 106B and cavity 112B, and waveguide 110C is optically coupled to component 106C and cavity 112C.

In some examples, each waveguide 110 include a transmission portion configured to transmit light from a light input surface to a light output surface. A light input surface may include any surface configured to receive optical signals from one or more optical components. As will be described further in FIGS. 2A-2C, waveguide 110 may include one or more sidewalls configured to internally reflect optical signals received by the light input surface and deliver the optical signals to a light output surface within vacuum envelope 104, and vice versa (e.g., receive an optical signal within vacuum envelope 104 and deliver the optical signal to an optical component).

In some examples, each waveguide 110 includes a distribution portion configured to distribute light into an interior of vacuum envelope 104, such as to one or more cavities 112. For example, the light output surface described above may be configured to change various properties, such as a direction, of the optical signals for distribution within cavities 112. In some examples, the distribution portion includes one or more optics configured to redirect light received from a transmission portion.

In some examples, the distribution portion includes a grating coupler at light input and/or output surfaces. For example, a grating may be an aperiodic structure of notches on substrate 108. The notches may fabricated on waveguides 110 to couple light into waveguide 110 from an external free-space beam or create a free-space beam from the light propagation in waveguide 110, such as into a cavity of vacuum envelope 104.

In some examples, assembly 100 includes one or more components 106 coupled to photonic integrated circuit 102. Components 106 may be configured to provide functionality to components, such as magneto-optical traps, within vacuum envelope 104. In some examples, components 106 include one or more optical components configured to emit light into the light input surface of at least one waveguide 110 or manipulate light transmitted through at least one waveguide 110. For example, In some examples, components 106 include one or more active optical components. Active optical components may include any components configured to generate and/or measure an optical signal using electrical power. A variety of active optical components may be used including, but not limited to, an amplifier, a laser, a light emitting diode (LED), a modulator, a detector, a wavelength converter, an active switch, an active attenuator, or an actively tuned resonator. Active optical components may be configured to receive electrical power from power components or control circuitry, such as microchip 118, via photonic integrated circuit 102. In some examples, the one or more active optical components include a laser configured to emit light into the light input surface of at least one waveguide 110.

In some examples, components 106 include one or more passive optical components. Passive optical components may include any components configured to manipulate an optical signal without using electrical power. A variety of passive optical components may be used including, but not limited to a waveguide, a coupler, a resonator, a grating, wavelength selective switch, a filter, a dispersion compensator, an attenuator, a gain equalizer, an isolator, or a circulator.

In some examples, components 106 include one or more active electronic components configured to control the one or more optical components and process signals from the one or more optical components. For example, substrate 108 may include a semiconductor substrate, such as silicon, such that the one or more active electric components may be configured on or into substrate 108. In some examples, assembly 100 includes one or more electrical feedthroughs extending through walls 114 of vacuum envelope 104 and/or substrate 108 of photonic integrated circuit 102. For example, the one or more electrical feedthroughs may be configured to couple to a getter and/or an ion pump. In some examples, the one or more electrical feedthroughs include silicon coated with an electrical conductor.

In some examples, vacuum cell assemblies discussed herein may be manufactured relatively easily and with relatively high uniformity compared to vacuum cell assemblies that do not include a vacuum envelope integrated with a photonic integrated circuit. FIG. 1B is a perspective view diagram illustrating an example substrate 116 that includes a plurality of vacuum cell assemblies 100A, 100B, 100C, and 100D (referred to individually as "vacuum cell assembly 100" and collectively as "vacuum cell assemblies 100"), in accordance with examples discussed herein. Each of vacuum cell assemblies 100 includes a respective vacuum envelope 104A, 104B, 104C, and 104D (referred to individually as "vacuum envelope 104" and collectively as "vacuum envelopes 104"), and a respective photonic integrated circuit 102A, 102B, 102C, and 102D (referred to individually as "photonic integrated circuit 102" and collectively as "photonic integrated circuits 102").

Substrate 116 may form a substrate, such as substrate 108 of FIG. 1A, for photonic integrated circuits 102. As will be described in FIG. 5, prior to separating substrate 116, components of photonic integrated circuits 102, such as waveguides and optical components, may be fabricated into substrate 116 using lithographic or other high yield fabrication techniques, while components of and within vacuum envelopes 104, such as ion pumps, getter materials, and walls of vacuum envelopes 104, may be fabricated onto substrate 116. In this way, the configuration of photonic integrated circuits 102, as a planar base for vacuum envelope 104, optical components, waveguides, and vacuum cell components may enable relatively simple and uniform batch processing of vacuum cell assemblies 100. In some examples, substrate 116 may be formed on a microchip 120, such as microchip 118 of FIG. 1A.

Figure 2A:
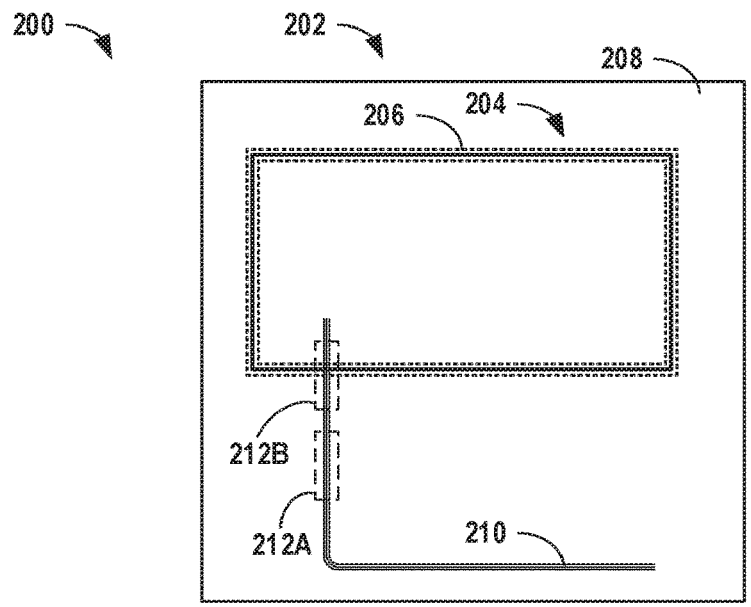
FIG. 2A is a top view diagram illustrating an example assembly, in accordance with examples discussed herein.

Vacuum cell assemblies described herein, such as vacuum cell assembly 100 of FIG. 1A, may include photonic integrated circuits, such as photonic integrated circuit 102 of FIG. 1A, that include waveguides directly formed in a surface of the photonic integrated circuit and that form a tight seal with walls of a vacuum envelope, such as vacuum envelope 104 of FIG. 1A. FIG. 2A is a top view diagram illustrating an example assembly 200, in accordance with examples discussed herein. Assembly 200 may be structurally and operationally similar to vacuum cell assembly 100 of FIG. 1A. For example, vacuum cell assembly 200 may include a photonic integrated circuit 202, a vacuum envelope 204, a substrate 208, and a waveguide 210 that corresponds to photonic integrated circuit 102, vacuum envelope 104, substrate 108, and waveguides 110 of FIG. 1A.

Photonic integrated circuit 202 includes a top surface 203. Top surface 203 may be configured to interface and bond with one or more walls of vacuum envelope 204. For example, as discussed in FIG. 1A with respect to vacuum envelope 104, vacuum envelope 204 may be configured to maintain relatively high vacuum. To reduce contaminants from entering vacuum envelope 204, materials and surfaces of the walls of vacuum envelope 204 and photonic integrated circuit 202 may be selected and configured for compatibility, such that vacuum envelope 204 and photonic integrated circuit 202 continue to form a tight bond during fabrication and/or operating conditions experienced in vacuum envelope 104 (e.g., a pressure less than about $10^{-7}$ torr and a temperature greater than about 300° C.).

In some examples, a portion 206 of top surface 203 of photonic integrated circuit 202 may be substantially planar. For example, portion 206 of top surface 203 may be configured to interface with a planar bottom surface of walls of vacuum envelope 204. Prior to bonding vacuum envelope 204 to portion 206, portion 206 may be pretreated to increase a planarity of portion 206.

Figure 2B:
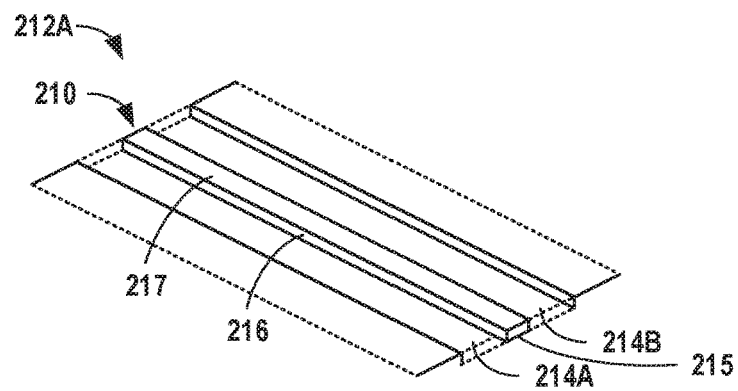
FIG. 2B is a perspective view diagram illustrating an example portion of a waveguide, in accordance with examples discussed herein.

FIG. 2B is a perspective view diagram illustrating an example portion 212A of a waveguide 210, in accordance with examples discussed herein. Waveguide 210 is bounded by one or more sidewall surfaces 216, a top surface 217, and a bottom surface 215. Substrate 208 includes adjacent waveguide channels 214A and 214B defining sidewall surfaces 216 of waveguide 210. For example, channels 214A and 214B may be formed using material removal techniques, such that sidewall surfaces 216 have relatively low roughness. Top surface 203 of substrate 208 defines top surface 217 of waveguide 210, such that top surface 217 of waveguide 210 may be planar with top surface 203 of substrate 208. An interface between waveguide 210 and an underlying layer of substrate 208 may define bottom surface 215 of waveguide 210. For example, as will be described in FIGS. 3A-3C, waveguide 210 may be formed from a first layer overlying a second layer, such that bottom surface 215 may be at an interface between the first layer and the second layer.

Waveguide 210 may be configured to transmit light through photonic integrated circuit 202. For example, top surface 217, bottom surface 215, and sidewall surfaces 216 may confine light within waveguide 210 through internal reflection, such that light is guided along waveguide 210 from one or more components (not shown) to vacuum envelope 204. Waveguide 210 may extend from a side of photonic integrated circuit 202 outside vacuum envelope 204 to a side of photonic integrated circuit 202 inside vacuum envelope 204, such that waveguide 210 may pass beneath one or more walls of vacuum envelope 204.

Figure 2C:
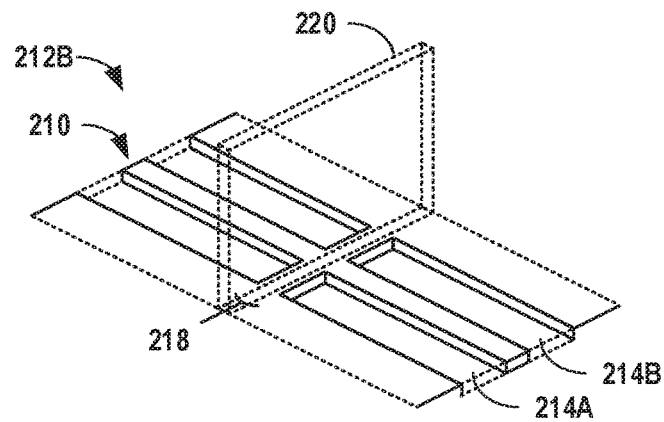
FIG. 2C is a perspective view diagram illustrating an example portion of a waveguide, in accordance with examples discussed herein.
Figure 4A:
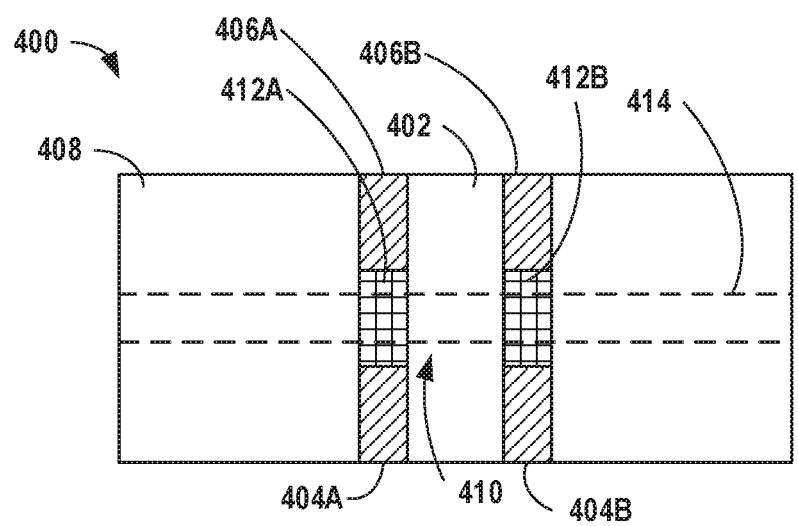
FIG. 4A is a top view diagram illustrating an example portion of a photonic integrated circuit that includes a linear bridge structure, in accordance with examples discussed herein.
Figure 4B:
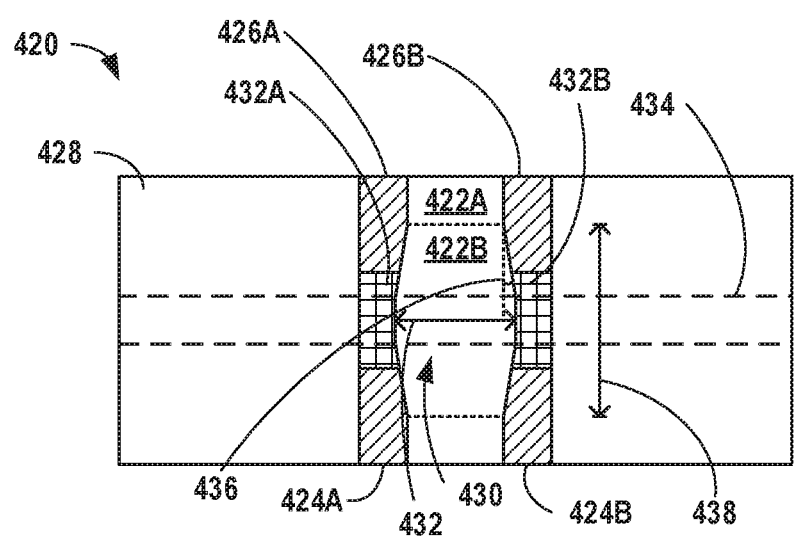
FIG. 4B is a top view diagram illustrating an example portion of a photonic integrated circuit that includes a tapered bridge structure, in accordance with examples discussed herein.

While top surface 217 of waveguide 210 may be substantially planar with top surface 203 of substrate 208, channels 214A and 214B may be substantially nonplanar with top surface 203 of substrate 208. To increase a planarity of portion 206 proximate to walls 220 of vacuum envelope 204, waveguide 210 may include one or more bridge structures. FIG. 2C is a perspective view diagram illustrating an example portion 212B of a waveguide 210 proximate to walls 220 of vacuum envelope 204, in accordance with examples discussed herein. To form a planar surface across channels 214A and 214B for bonding to vacuum envelope 204, waveguide 210 may include bridge structure 218. Bridge structure 218 is configured to couple to the one or more walls 220 of vacuum envelope 204 or one or more intermediate layers between walls 220 and bridge structure 218. In the example of FIG. 2C, bridge structure 218 is planar with portion 206 of top surface 203 of substrate 208. Bridge structure 218 intersects the adjacent waveguide channels 214A and 214B at portion 206 of top surface 203 of substrate 208. Bridge structure 218 may have a variety of forms. In some examples, bridge structure 218 tapers from sidewall surfaces 216 of waveguide 210 to an opposite edge of each adjacent waveguide channel 214A and 214B, such as illustrated in FIG. 4B below.

Bridge structure is configured to guide optical signals through the bridge structure. For example, optical signals may have various properties, such as amplitude, frequency, and phase, that may affect measurement of properties within vacuum envelope 104. For portions of waveguide 210 that are not proximate to walls 220, sidewall surfaces 216 may be adjacent to, and have a relatively high difference in refractive index with, air (or other fluid medium) or vacuum. However, for portion of waveguide 210 that are proximate to walls 220, sidewall surfaces 216 may be adjacent to materials having a relatively similar refractive index. To preserve the properties of the optical signals, bridge structure 218 may be configured to reduce changes in properties, such as refractive index, that may occur due to a change in material in channels 214. For example, bridge structure 218 may change a refractive index of cladding at sidewall surface 216 to reduce a change in refractive index of the cladding at bridge structure 218. In some examples, such as described in FIGS. 3B and 3C below, bridge structure 218 may include a material configured to preserve properties of optical signals transmitted through bridge structure 218. In some examples, such as described in FIGS. 4A and 4B below, bridge structure 218 may include a shape configured to preserve properties of optical signals transmitted through bridge structure 218.

Figure 3A:
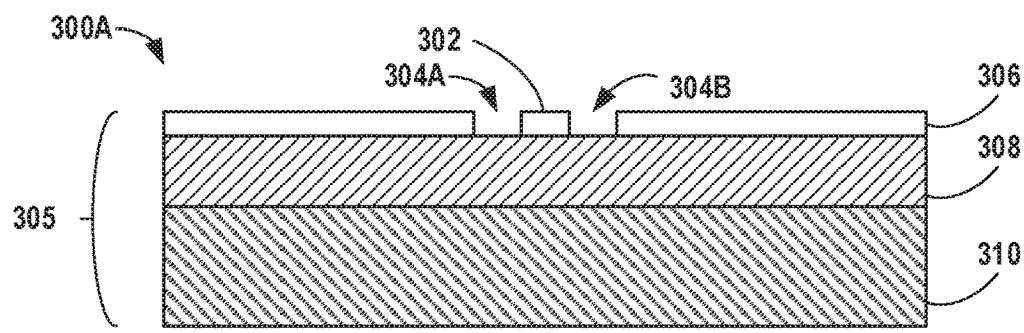
FIG. 3A is a side view diagram illustrating an example portion of a photonic integrated circuit, in accordance with examples discussed herein.

Vacuum cell assemblies described herein, such as vacuum cell assembly 100 of FIG. 1A, may include photonic integrated circuits, such as photonic integrated circuit 102 of FIG. 1A, and/or vacuum envelopes, such as vacuum envelope 104 of FIG. 1A, that include a plurality of layers to form a tight seal. FIG. 3A is a side view diagram illustrating an example portion 300A of a photonic integrated circuit away from a vacuum envelope, in accordance with examples discussed herein. At portion 300A, substrate 305 includes a top layer 306, a first base layer 308, and a second base layer 310. As one example, top layer 306 can be silicon nitride; first base layer 308 can be silica; and second base layer 310 can be silicon. As another example, top layer 306, first base layer 308, and second base layer 310 may each be a Group III-V semiconductor, such as gallium arsenide.

Channels 304A and 304B (individually "channel 304" and collectively "channels 304") may be formed into top layer 306, and may define waveguide 302. First base layer 308 may be configured as a cladding layer for waveguide 302. Top layer 306, first base layer 308, and second base layer 310 may have a variety of thicknesses. In some examples, top layer 306 has a thickness corresponding to a height of waveguide 302. For example, top layer 306 may have a thickness between about 100 nm and about 500 nm, such as about 250 nm. In some examples, first base layer 308 may have a thickness between about 1 μm and about 5 μm, such as about 3 μm.

Figure 3B:
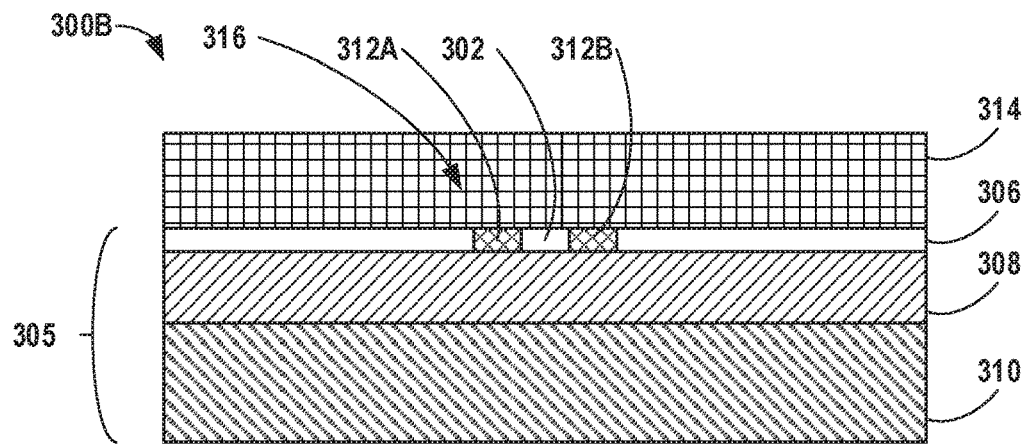
FIG. 3B is a side view diagram illustrating an example portion of a photonic proximate to a bridge structure, in accordance with examples discussed herein.

In some examples, one or more walls of a vacuum envelope are directly coupled to a top surface of a substrate. FIG. 3B is a side view diagram illustrating an example portion 300B of a photonic integrated circuit adjacent to a vacuum envelope, in accordance with examples discussed herein. In portion 300B, waveguide 302 includes a bridge structure 316 that includes adjacent channel structures 312A and 312B (individual "channel structure 312" and collectively "channel structures 312"). Each adjacent channel structure 312 may be configured to intersect a respective channel 304 to form a planar surface across top layer 306. A variety of materials may be used for channel structures 312 including, but not limited to, silicon nitride, silica, silicon, Group III-V semiconductors, and the like. In some examples, top layer 306 and channel structures 312 are formed from a same material (e.g., by removing material from top layer 306 to form discontinuous channels 304 and channels structures 312 between the discontinuous channels 304). For example, top layer 306 and channel structures 312 may be configured to reduce a difference in coefficient of thermal expansion or manufacturing complexity. In some examples, top layer 306 and channel structures 312 are formed from a different material (e.g., by removing material from top layer 306 to form continuous channels 304 and filling in a portion of channels 304 to form channel structures 312). For example, top layer 306 and channel structures 312 may be configured to increase total internal reflection across bridge structure 316.

Figure 3C:
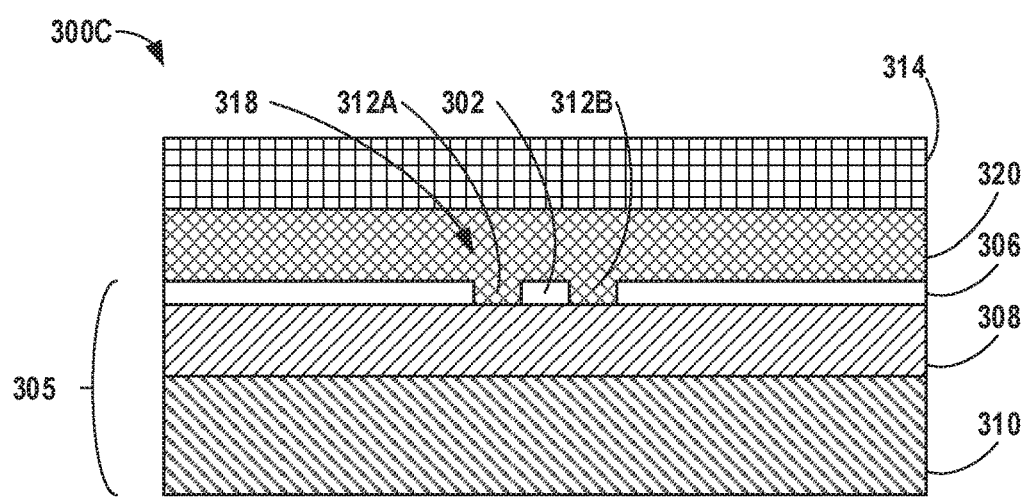
FIG. 3C is a side view diagram illustrating an example portion of a photonic proximate to a bridge structure, in accordance with examples discussed herein.

In some examples, the photonic integrated circuit includes a buried waveguide having one or more intermediate layers between the vacuum envelope and the waveguide. FIG. 3C is a side view diagram illustrating an example portion 300C of a photonic integrated circuit near a vacuum envelope, in accordance with examples discussed herein. Portion 300C includes an intermediate layer 320. While illustrated as a single layer, in some instances, intermediate layer 320 may include multiple layers. In the example of FIG. 3C, waveguide 302 is buried at a bridge structure 318 by an intermediate layer 320 that forms channel structures 312A and 312B. Intermediate layer 320 may form a planar surface for bonding with walls 314. A buried waveguide may have, for example, reduced losses across bridge structure 318 compared to a waveguide that is not buried.

In some examples, intermediate layer 320 may be present on substrate 305 at portions of photonic integrated circuit 300 that are not proximate to walls 314. For example, rather than form a localized bridge structure 318 only near walls 314, intermediate layer 320 may overlie other portions of waveguide 302, such that some or all of waveguide 302 may be buried (i.e., surrounded on sidewall surfaces and top surface). By burying waveguide 302, intermediate layer 320 may assist in maintaining an integrity of waveguide 302 during bonding of walls 314 to intermediate layer 320, thereby permitting a wider variety of materials to be used for waveguide 302.

In some examples, intermediate layer 320 may be configured to bound waveguide 302. In some examples, intermediate layer 320 is formed from a material configured to provide relatively high internal reflection for waveguide 302. For example, intermediate layer 320 and first base layer 308 may include a same material, such as silica, such that waveguide 302 is bounded by a same material. In some examples, intermediate layer 320 may be configured to bond to walls 314. In some examples, a material of intermediate layer 320 may be compatible with a material of walls 314. For example, a material of intermediate layer 320 may have a CTE that is relatively similar to a material of walls 314. A variety of materials may be used to form intermediate layer 320 including, but not limited to, silica, silicon nitride, and the like. In some examples, intermediate layer 320 may have a thickness between about 1 μm and about 5 μm, such as about 3 μm.

Example vacuum cell assemblies described herein may include bridge structures having various shapes. In some examples, bridge structures may include a waveguide portion having linear sidewalls. FIG. 4A is a top view diagram illustrating an example portion 400 of a photonic integrated circuit that includes a linear bridge structure 410, in accordance with examples discussed herein. Bridge structure 410 may include waveguide 402 and adjacent channel structures 412A and 412B intersecting channels 404A and 404B on a first side of vacuum envelope 414 and channels 406A and 406B on a second, opposite side of vacuum envelope 414. Channels 404A, 404B, 404A, and 406B may be relatively easy to fabricate, such as by using etching, lithography, or other bulk fabrication method that forms relatively linear channels in substrate 408.

Structural features of waveguides, such as shape of sidewalls, may be configured based on one or more properties of the optical signals intended to be transmitted through waveguides. In some examples, bridge structures may include a waveguide portion having nonlinear sidewalls. FIG. 4B is a top view diagram illustrating an example portion 420 of a photonic integrated circuit that includes a tapered bridge structure 430, in accordance with examples discussed herein. Tapered bridge structure 430 may include a tapered portion of waveguide 422B and adjacent channel structures 432A and 432B intersecting channels 424A and 424B on a first side of vacuum envelope 434 and channels 426A and 426B on a second, opposite side of vacuum envelope 434.

Tapered portion of waveguide 422B may include sidewalls forming an angle 436 with a linear portion of waveguide 422A and width 432. Tapered portion of waveguide 422B may have a length 438 between linear portions of waveguide 422A. Tapered portion of waveguide 422B may have a shape and/or dimensions related to a wavelength and tolerable loss of waveguide 422A. In the example of FIG. 4B, angle 436, width 432, and/or length 438 may be selected to reduce attenuation, frequency shift, and/or phase shift of optical signals transmitted through bridge structure 430. For example, due to a difference of materials of adjacent channel structures 432A and 432B, an optical signal may be reflected differently in portions of waveguide that are adjacent channel structures 432A and 432B than portions of waveguide that are adjacent air-filled channels, such as channels 304A and 304B of FIG. 3A. To preserve the various properties of light, surfaces of tapered portion 422B may be configured to reflect and/or refract light to reduce a difference in properties of the optical signal prior to entering tapered portion of waveguide 422B and after exiting tapered portion of waveguide 422B.

In some examples, width 432 may be selected based on a wavelength of optical signal intended to be transmitted through waveguide 422. For example, width 432 of tapered portion of waveguide 422B may be configured to expand a guided mode of the light to reduce loses. To guide light, waveguide 422 may have a sufficient cross-section (i.e., width 432) that may be a fraction of wavelength of the light.

In some examples, angle 436 and/or length 438 may be selected based on a wavelength of optical signals intended to be transmitted through waveguide 422. For example, a wavelength of optical signals transmitted through a particular waveguide 422 may be have a relatively narrow range for a particular atomic sensor, such that bridge structure 430 may be configured to preserve optical signals having a wavelength in the range. In some examples, the guided light of the optical signal has a wavelength range of about 50 nanometers.

Figure 5A:
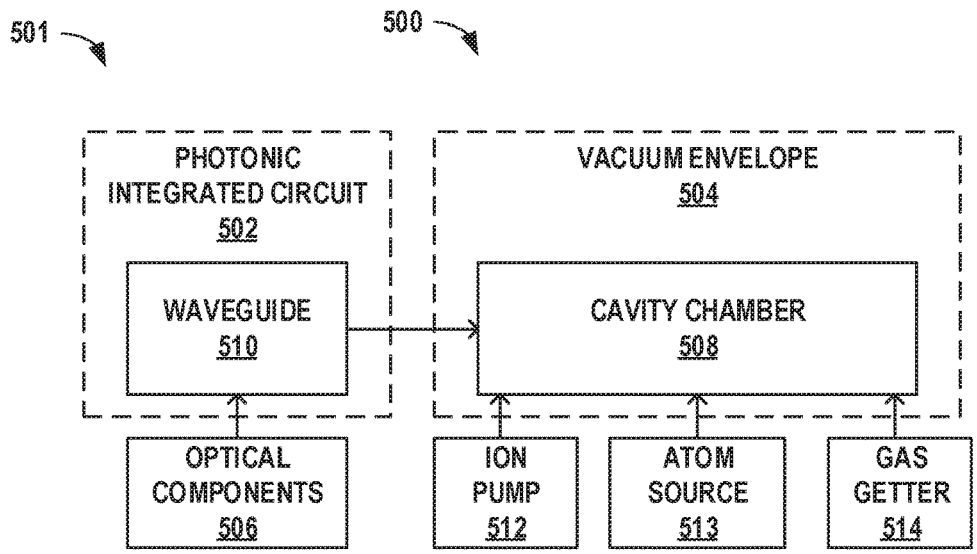
FIG. 5A is a conceptual and schematic block diagram illustrating an example atomic sensor, in accordance with examples discussed herein.

Vacuum cell assemblies described herein may be used to provide a high vacuum, optically accessible environment for an atomic sensor. In some examples, vacuum cell assemblies described herein may be used in a magnetooptical trap sensor. FIG. 5A is a conceptual and schematic block diagram illustrating an example atomic sensor 501 that includes a vacuum cell assembly 500, in accordance with examples discussed herein.

Vacuum cell assembly 500 includes one or more photonic integrated circuits 502, such as photonic integrated circuit 102 of FIG. 1A. Each photonic integrated circuit includes one or more waveguides 510 configured in a substrate. Vacuum cell assembly 500 includes a vacuum envelope 504 that includes one or more walls coupled to a top surface of each photonic integrated circuit 502 and forms at least one cavity. In the example of FIG. 5A, vacuum envelope 504 includes a cavity chamber 508 configured to receive one or more magnetooptical trap (MOT) beams from photonic integrated circuit 502. Each waveguide 510 is configured to distribute light received by a light input surface from one or more optical components 506 to an interior of cavity chamber 508. In some examples, vacuum envelope 504 may include various chambers that include one or more getter materials selected to adsorb particular gases.

Due to permeation of helium and other gases, atomic sensor 501 may utilize active pumping of gases from the sensor volume. In the example of FIG. 5A, atomic sensor 501 includes an ion pump 512, an atom source 513, and a gas getter 515 fluidically coupled to vacuum envelope 104. Ion pump 512 is configured to remove contaminants from cavity chamber 508 and reduce a pressure of cavity chamber 508. Ion pump 512 may be relatively low size, weight, power, and cost (SWAP-C) and capable of evacuating cavity chamber 508 to ultra-high vacuum (e.g., pressures of less than $10^{-9}$ torr). In some examples, ion pump 512 may directly integrate with cavity chamber 508, e.g., by being formed as part of the same substrate or sealed vacuum envelope 504 and may not produce magnetic fields that distorts physics being performed in cavity chamber 508. Atom source 513 may be configured to dispense atoms or elements used as the sensing element in the physics chamber. Source 513 can dispense alkali metals such as rubidium, cesium, sodium; alkali earth metals such as calcium, strontium; and lanthanoids such as ytterbium. Gas getter 514 may be configured to adsorb gases, including inert and reactive gasses. Getter 514 can also absorb excess alkali atoms from atom source 513 by the proper choice of material; such materials are gold. As such, gas getter 514 may remove contaminant gases that may deteriorate the pressure of the various chambers of sensor 501.

In some examples, ion pump 512 is a compact ion pump capable of creating a high vacuum with reduced magnetic interference. Ion pump 512 may utilize an electrostatic field to confine electrons within ion pump 512 without using magnets or magnetic fields. For example, ion pump 512 may include an inner electrode maintained at a positive electrostatic potential with an outer electrode. Electrons introduced into an inner volume of the outer electrode are confined within the inner volume by the positive electrostatic potential between the inner and outer electrodes. As the electrons orbit the inner electrode, the electrons impact and ionize gas molecules within the inner volume. The positive electrostatic potential further causes the gas ions to accelerate toward and adsorb into an inner surface of the outer electrode. In this way, ion pump 512 may create a relatively high vacuum (e.g., $<10^{-4}$ torr) without using magnets or creating magnetic fields. Further description of ion pump 512 may be provided in U.S. Provisional Patent Application Ser. No. 62/531,270 entitled "Magnet-Free Ion Pump" and filed Jul. 11, 2017, and PCT Application Ser. No. PCT/US2018/041614 entitled "Compact Electrostatic Ion Pump" and filed Jul. 11, 2018, the entire contents of each of which is incorporated herein by references in their entirety.

Figure 5B:
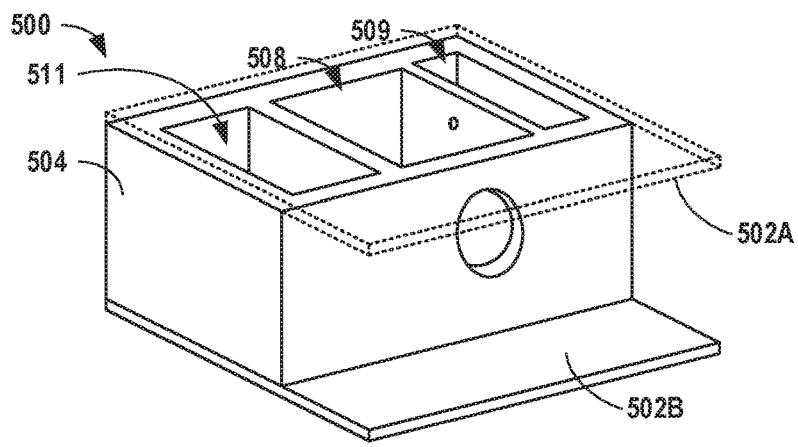
FIG. 5B is a perspective view diagram illustrating an example vacuum cell assembly for an atomic sensor, in accordance with examples discussed herein.

FIG. 5B is a perspective view diagram illustrating an example vacuum cell assembly for atomic sensor 501 of FIG. 5A, in accordance with examples discussed herein. Vacuum envelope 504 includes ion pump cavity 511 configured to house ion pump 512 of FIG. 5A, cavity chamber 508, and getter cavity 509 configured to house atom source 513 and/or gas getter 515. Photonic integrated circuits 502A and 502B are integrated with vacuum envelope 504.

Figure 5C:
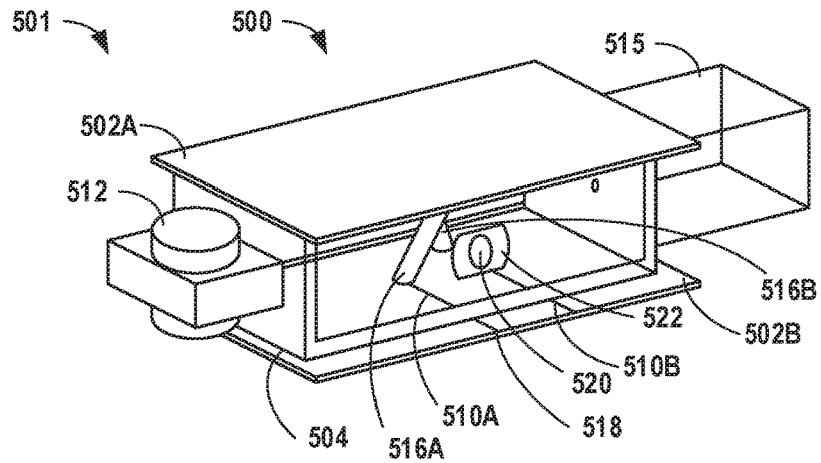
FIG. 5C is a perspective view diagram illustrating an example atomic sensor, in accordance with examples discussed herein.

FIG. 5C is a perspective view diagram illustrating an example MOT sensor, in accordance with examples discussed herein. Atomic sensor 501 includes vacuum cell assembly 500, ion pump 512 fluidically coupled to vacuum cell assembly 500, and a getter cavity 509 fluidically coupled to vacuum cell assembly 500. Vacuum cell assembly 500 includes two photonic integrated circuits 502A and 502B coupled to a vacuum envelope 504. Vacuum envelope 504 defines cavity chamber 508 and includes an optical cavity input 520 and optical cavity mirror 522. Photonic integrated circuit 502B includes a first waveguide 510A configured to emit a first MOT beam 516A and a second waveguide 510B configured to emit a second MOT beam 516B. Each waveguide 510A and 510B may include a light input surface 518 configured to receive optical signals from one or more optical components. Atomic sensor 501 includes a two-dimensional MOT chamber 515 fluidically coupled to cavity chamber 508.

Figure 5D:
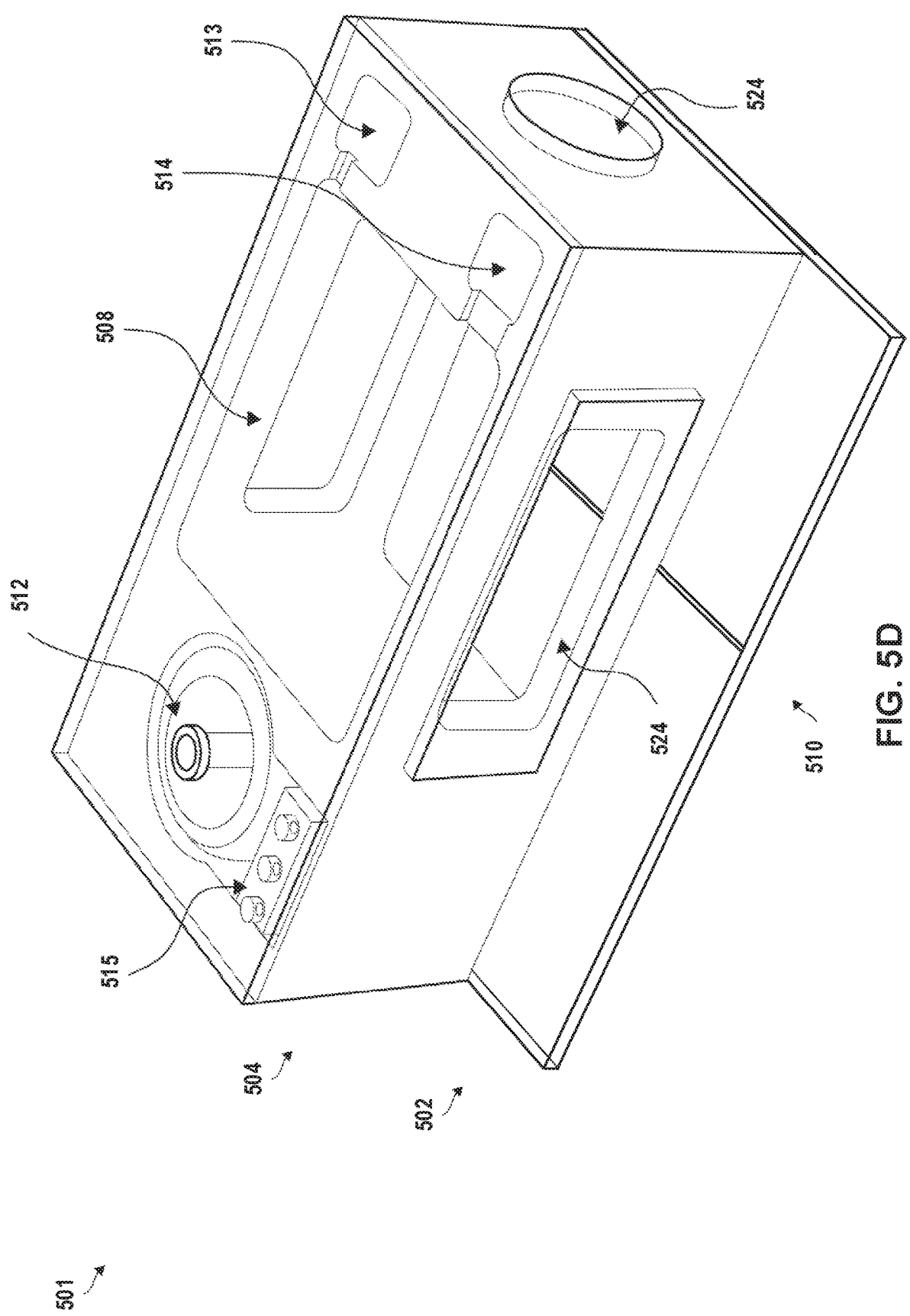
FIG. 5D is a perspective view diagram illustrating an example MOT sensor, in accordance with examples discussed herein.

FIG. 5D is a perspective view diagram illustrating an example MOT sensor, in accordance with examples discussed herein. Sensor 501 includes a magnet-free ion pump 512 and a cold-atom physics chamber 508. Sensor 501 include a PIC 502 that includes waveguides 510. Sensor 501 also includes a Spindt cold-cathode electron beam source 515, an alkali source/dispenser 513, getter 514, and side optical windows 524, which may include mirrors, waveplates, or the like. By achieving small size, low weight, and low power, magnet-free ion pump 512 may enable integrated sensor 501 to be relatively small and low power.

Figure 6:
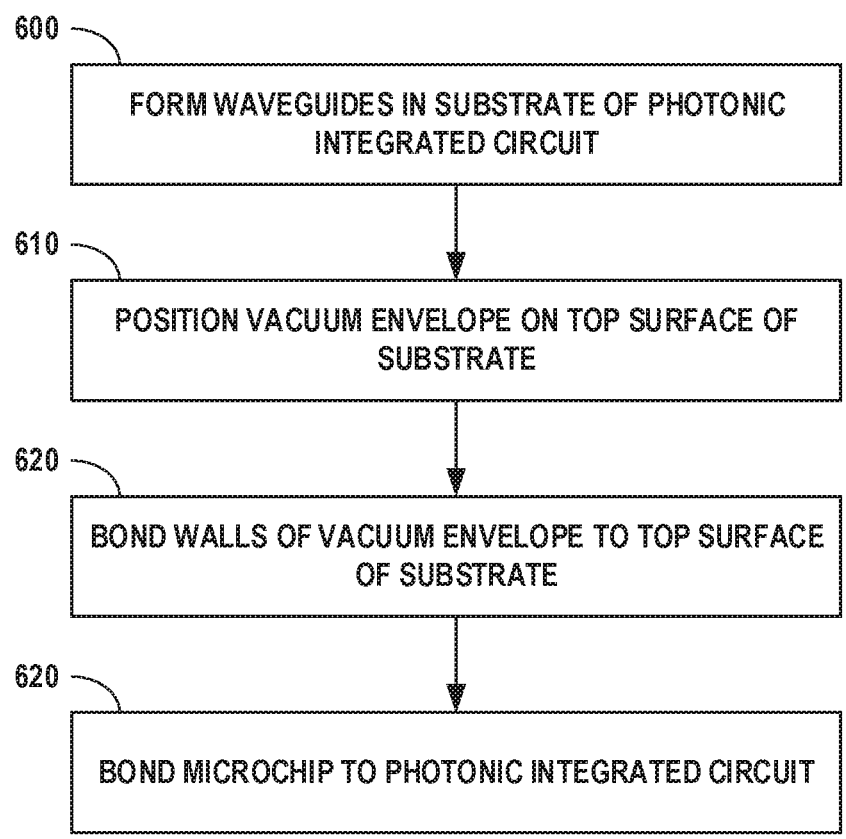
FIG. 6 is a flowchart of an example technique for forming one or more vacuum cells, in accordance with examples described herein.

FIG. 6 is a flowchart of an example method for forming one or more vacuum cells, in accordance with examples described herein. The method of FIG. 6 will be described with respect to vacuum cell assembly 100 of FIG. 1A; however, the method of FIG. 6 may be used to manufacture other vacuum cell assemblies.

The method of FIG. 6 may include forming waveguides 110 in substrate 108 of photonic integrated circuit 102 (600). In some examples, photonic integrated circuit 102 may include exposed waveguides, such as illustrated in FIG. 3A. In such examples, forming waveguides 302 may include forming one or more base layers, such as a first base layer 308 overlying a second base layer 310, forming a top layer over the one or more base layers, such as top layer 306 overlying first base layer 308, and forming one or more channels 304 in top layer 306 to form waveguides 302.

In some examples, photonic integrated circuit 102 may include bridge structures near vacuum envelope 104, such as bridge structure 316 of FIG. 3B. As one example, forming waveguides 302 may include depositing channel structures 312 in channels 304. For example, a material, such as silicon nitride, may be deposited into channels 304 to form a planar surface. As another example, forming waveguides 302 may include forming channel structures 312 from top layer 306. For example, channels 304 may be formed discontinuously, such that material from top layer 306 is not removed for bridge structure 316.

In some examples, photonic integrated circuit 102 may include bridge structures that have particular shapes, such as bridge structure 430 of FIG. 4B, configured for particular properties of an optical signal. For example, forming waveguides 422 may include forming channels 424 and 426 such that waveguide 422 has a particular shape, such as angle 436 and/or length 438, corresponding to desired properties of an optical signal.

In some examples, photonic integrated circuit 102 may include buried waveguides, such as illustrated in FIG. 3C. As one example, forming waveguides 302 may include forming one or more intermediate layers, such as intermediate layer 320, over waveguide 302 to substantially surround waveguide 302. As another example, forming waveguides 302 may include forming intermediate layer 320 that includes two or more intermediate layers, such as a layer configured to bond with vacuum envelope 104.

The method of FIG. 6 may include positioning vacuum envelop 104 on top surface 109 of substrate 108 (610). For example, a portion of substrate 108, such as portion 206 described in FIG. 2A, may be configured to receive vacuum envelope 104, and may include various structures, such as bridge structure 218 of FIG. 2C, that may form a planar surface for bonding to walls 220.

The method of FIG. 6 may include bonding walls 114 of vacuum envelope 104 to top surface 109 of substrate 108 (620). Anodic bonding may involve placing vacuum envelope 104 and photonic integrated circuit 102 between metal electrodes at an elevated temperature, with a relatively high direct current (DC) potential applied between the electrodes to create an electric field that penetrates the substrates. Dopants in at least one of the components may be displaced by application of the electric field, causing dopant depletion at a surface of the respective component that renders the component highly reactive with the other component to allow the creation of a chemical bond. Alternative assembly techniques that may be used, particularly when different kinds of materials are used, include direct bonding techniques, intermediate layer bonding techniques, frit sealing, contact bonding, and other bonding techniques. In other instances, other assembly techniques that use adhesion, including the use of a variety of epoxies, elastomers, thermoplastic adhesives, or thermosetting adhesives may be used.

In some examples, each waveguide 110 may include a bridge structure planar with the top surface of substrate 108, such as bridge structure 218 of FIG. 2C. In such examples, anodically bonding walls 220 of vacuum envelope 204 to top surface 209 of substrate 208 may include anodically bonding at least a portion of walls 220 of vacuum envelope 204 to bridge structure 218 of each waveguide 210.

In some examples, the method of FIG. 6 may include bonding microchip 118 to photonic integrated circuit 102 (630). For example, bonding microchip 118 may include bump bonding microchip 118 to a bottom surface of photonic integrated circuit 102.

In some examples, the one or more vacuum cells includes a plurality of vacuum cells, such as vacuum cell assemblies 100A, 100B, 100C, and 100D of FIG. 1B. To more efficiently and/or uniformly fabricate vacuum cell assemblies 100, the one or more vacuum cells assemblies 100 may be formed using batch processing. For example, step 600 may be performed for multiple photonic integrated circuits 102A, 102B, 102C, and 102; step 610 may be performed for multiple vacuum envelopes 104A, 104B, 104C, and 104D; and step 620 may be performed for multiple vacuum envelopes 104 and photonic integrated circuits 102. In such examples, the method may include separating the plurality of vacuum cell assemblies 100. For example, substrate 116 may be cut to separate photonic integrated circuits 102A, 102B, 102C, and 102D.

EXAMPLES

Example 1: An apparatus, comprising: a photonic integrated circuit comprising one or more waveguides configured in a substrate; and a vacuum envelope comprising one or more walls coupled to a top surface of the substrate, wherein each waveguide is configured to transmit light from a light input surface to an interior of the vacuum envelope.

Example 2: The apparatus of example 1, wherein the vacuum envelope comprises a pump cavity, and wherein the apparatus further comprises a magnet-free ion pump housed in the pump cavity.

Example 3: The apparatus of example 1 or 2, wherein a portion of the top surface of the photonic integrated circuit is substantially planar.

Example 4: The apparatus of example 3, wherein each waveguide comprises a bridge structure coupled to the one or more walls of the vacuum envelope and planar with the portion of the top surface of the substrate.

Example 5: The apparatus of example 4, wherein, for each waveguide: the substrate comprises adjacent waveguide channels defining sidewall surfaces of the waveguide, and the top surface of the substrate defines a top surface of the waveguide, and wherein the bridge structure intersects the adjacent waveguide channels.

Example 6: The apparatus of example 5, wherein the bridge structure tapers from a sidewall surface of the waveguide to an opposite edge of each adjacent waveguide channel.

Example 7: The apparatus of any of examples 4 to 6, wherein the bridge structure is configured to guide light through the bridge structure, and wherein the guided light has a wavelength range of about 50 nanometers.

Example 8: The apparatus of any of examples 1 to 7, wherein a coefficient of thermal expansion (CTE) of a surface of the substrate is within at least one of: about 5 ppm/° C. of a CTE of the one or more walls of the vacuum envelope, or about a factor of 3 of the CTE of the one or more walls of the vacuum envelope.

Example 9: The apparatus of any of examples 1 to 8, wherein the one or more walls of the vacuum envelope are directly coupled to the top surface of the substrate.

Example 10: The apparatus of any of examples 1 to 9, further comprising an intermediate layer between the one or more walls of the vacuum envelope and the top surface of the substrate.

Example 11: The apparatus of any of examples 1 to 10, wherein the substrate comprises a Group III-V compound semiconductor and the one or more walls of the vacuum envelope comprise at least one of silicon or a silicon-based compound.

Example 12: The apparatus of any of examples 1 to 11, further comprising one or more optical components coupled to the photonic integrated circuit and configured to emit light into the light input surface of at least one waveguide or manipulate light transmitted through at least one waveguide.

Example 13: The apparatus of example 12, wherein the one or more optical components comprise a laser configured to emit light into the light input surface of at least one waveguide.

Example 14: The apparatus of example 13, further comprising one or more active electronic components coupled to the photonic integrated circuit and configured to control the one or more optical components and process signals from the one or more optical components.

Example 15: The apparatus of example 14, wherein the one or more active electronic components are configured on the substrate.

Example 16: The apparatus of any of examples 1 to 15, wherein the vacuum envelope comprises: a getter cavity housing a getter; and a magneto-optical trap (MOT) cavity fluidically coupled to the getter cavity and the pump cavity.

Example 17: The apparatus of any of examples 1 to 16, further comprising a microchip underlying the substrate.

Example 18: A method for forming one or more vacuum cells comprising, for each vacuum cell: forming one or more waveguides in a substrate of a photonic integrated circuit; and bonding one or more walls of a vacuum envelope to a top surface of the substrate to form the vacuum cell.

Example 19: The method of example 18, wherein each waveguide comprises a bridge structure planar with the top surface of the substrate, and wherein bonding the one or more walls of the vacuum envelope to the top surface of the substrate further comprises anodically bonding at least a portion of the one or more walls of the vacuum envelope to the bridge structure of each waveguide.

Example 20: The method of example 18 or 19, wherein the one or more vacuum cells comprise a plurality of vacuum cells, and further comprising separating the plurality of vacuum cells.

Various examples have been described. These and other examples are within the scope of the following claims.

What is claimed is:

1. An apparatus, comprising:
    a photonic integrated circuit comprising one or more waveguides configured in a substrate, wherein a portion of a top surface of the substrate is substantially planar; and
    a vacuum envelope comprising one or more walls coupled to the portion of the top surface of the substrate,
    wherein each waveguide is configured to transmit light from a light input surface of the photonic integrated circuit exterior to the vacuum envelope to an interior of the vacuum envelope, and
    wherein, for each waveguide:
        the substrate comprises adjacent waveguide channels defining sidewall surfaces of the waveguide, and
        the top surface of the substrate defines a top surface of the waveguide,
    wherein each waveguide includes a bridge structure coupled to the one or more walls of the vacuum envelope and planar with the portion of the top surface of the substrate, and
    wherein the bridge structure intersects the adjacent waveguide channels.

2. The apparatus of claim 1,
    wherein the vacuum envelope comprises a pump cavity, and
    wherein the apparatus further comprises a magnet-free ion pump housed in the pump cavity.

3. The apparatus of claim 1, wherein the bridge structure tapers from a sidewall surface of the waveguide to an opposite edge of each adjacent waveguide channel.

4. The apparatus of claim 1,
    wherein the bridge structure is configured to guide light through the bridge structure, and
    wherein the guided light has a wavelength range of about 50 nanometers.

5. The apparatus of claim 1, wherein a coefficient of thermal expansion (CTE) of a surface of the substrate is within at least one of:
    about 5 ppm/° C. of a CTE of the one or more walls of the vacuum envelope, or
    about a factor of 3 of the CTE of the one or more walls of the vacuum envelope.

6. The apparatus of claim 1, wherein the one or more walls of the vacuum envelope are directly coupled to the top surface of the substrate.

7. The apparatus of claim 1, further comprising an intermediate layer between the one or more walls of the vacuum envelope and the top surface of the substrate.

8. The apparatus of claim 1, wherein the substrate comprises a Group III-V compound semiconductor and the one or more walls of the vacuum envelope comprise at least one of silicon or a silicon-based compound.

9. The apparatus of claim 1, further comprising one or more optical components coupled to the photonic integrated circuit and configured to emit light into the light input surface of at least one waveguide or manipulate light transmitted through at least one waveguide.

10. The apparatus of claim 9, wherein the one or more optical components comprise a laser configured to emit light into the light input surface of at least one waveguide.

11. The apparatus of claim 10, further comprising one or more active electronic components coupled to the photonic integrated circuit and configured to control the one or more optical components and process signals from the one or more optical components.

12. The apparatus of claim 11, wherein the one or more active electronic components are configured on the substrate.

13. The apparatus of claim 1, wherein the vacuum envelope comprises:
    a getter cavity housing a getter; and
    a magneto-optical trap (MOT) cavity fluidically coupled to the getter cavity and the pump cavity.

14. The apparatus of claim 1, further comprising a microchip underlying the substrate.

15. A method for forming one or more vacuum cells comprising, for each vacuum cell:
    forming one or more waveguides in a substrate of a photonic integrated circuit, wherein a portion of a top surface of the substrate is substantially planar; and
    bonding one or more walls of a vacuum envelope to the portion of the top surface of the substrate to form the vacuum cell,
    wherein each waveguide is configured to transmit light from a light input surface of the photonic integrated circuit exterior to the vacuum envelope to an interior of the vacuum envelope, and
    wherein, for each waveguide:
        the substrate comprises adjacent waveguide channels defining sidewall surfaces of the waveguide, and
        the top surface of the substrate defines a top surface of the waveguide,
    wherein each waveguide includes a bridge structure coupled to the one or more walls of the vacuum envelope and planar with the portion of the top surface of the substrate, and
    wherein the bridge structure intersects the adjacent waveguide channel.

16. The method of claim 15,
    wherein bonding the one or more walls of the vacuum envelope to the top surface of the substrate further comprises anodically bonding at least a portion of the one or more walls of the vacuum envelope to the bridge structure of each waveguide.

17. The method of claim 15, wherein the one or more vacuum cells comprise a plurality of vacuum cells, and further comprising separating the plurality of vacuum cells.

* * * * *